United States Patent [19]

Bhalla

[11] 4,162,151
[45] Jul. 24, 1979

[54] METHOD OF FORMING ARC TUBE END SEAL

[75] Inventor: Ranbir S. Bhalla, West Paterson, N.J.

[73] Assignee: Westinghouse Electric Corp., Pittsburgh, Pa.

[21] Appl. No.: 875,956

[22] Filed: Feb. 8, 1978

Related U.S. Application Data

[62] Division of Ser. No. 796,579, May 13, 1977, Pat. No. 4,103,200.

[51] Int. Cl.² .................. C03B 23/20; C03C 27/02
[52] U.S. Cl. .............................. 65/42; 65/43; 65/59 R; 65/59 B; 65/32
[58] Field of Search .............. 65/42, 43, 59 B, 59 R, 65/32

[56] References Cited

U.S. PATENT DOCUMENTS

| | | | |
|---|---|---|---|
| 3,243,635 | 3/1966 | Louden et al. | 65/43 |
| 3,281,309 | 10/1966 | Ross | 65/43 X |
| 3,469,729 | 9/1969 | Grekila et al. | 65/43 X |
| 3,479,170 | 11/1969 | Louden | 65/43 X |
| 3,737,977 | 6/1973 | Jorgensen | 65/59 R X |
| 3,833,348 | 9/1974 | Stokes et al. | 65/43 |
| 4,004,173 | 1/1977 | Rigden | 65/59 R |
| 4,050,956 | 9/1977 | DeBruin et al. | 65/59 R X |

Primary Examiner—Richard V. Fisher
Assistant Examiner—F. W. Miga
Attorney, Agent, or Firm—B. R. Studebaker

[57] ABSTRACT

An improved arc tube end seal and the method of forming that seal in a high pressure sodium discharge lamp is disclosed. The method includes precoating the refractory metal end cap with a slurry of metallic silicon and baking the end cap prior to accomplishing the bonding of the end cap to the arc tube with a conventional sealing frit.

9 Claims, 4 Drawing Figures

METHOD OF FORMING ARC TUBE END SEAL

This is a division of application Ser. No. 796,579 filed May 13, 1977 now U.S. Pat. No. 4,103,200 issued July 25, 1978.

BACKGROUND OF THE INVENTION

The high pressure sodium discharge lamp with its highly efficient golden-yellow discharge has made a tremendous impact on city street and highway lighting. One of the most critical operations in the manufacture of a high pressure sodium discharge lamp is the sealing of the refractory metal end caps to the polycrystalline alumina or sapphire arc tube body. Additionally, most early lamp failures can be traced to a breakdown of the seal between the arc tube and its end caps, and can in many cases be further identified as a failure of the bond between the sealing frit and the end cap at their interface.

Commercial high pressure sodium discharge lamps employ a glassy sealing frit to bond the arc tube body to the refractory metal end caps, and that glassy sealing frit in almost all instances principally comprises aluminum oxide and calcium oxide in about eutectic proportions. Most of these sealing frits generally include small quantities of other metallic oxides such as silicon dioxide, magnesium oxide, barium oxide, yttrium oxide, etc. Several of these sealing compositions along with the method by which the polycrystalline alumina arc tube is bonded to the refractory metal end cap in the high pressure sodium discharge lamp are disclosed in U.S. Pat. No. 3,281,309 to J. F. Ross; U.S. Pat. No. 3,469,729 to R. B. Grekila et al; and U.S. Pat. No. 3,588,577 to Charles I. McVey et al. The inadequacies of the bond between the sealing glass frit and the refractory metal end cap has been previously recognized and efforts have been continuing to solve this problem. One attempt at a solution is disclosed in U.S. Pat. No. 3,448,319 to W. C. Louden in which a suspension of tungsten trioxide in a suitable binder mixed with a minor proportion of the sealing composition was coated on the interior surface of the end cap. In that process, great care had to be taken to assure that the tungsten layer was completely overcoated with a layer of ceramic sealing material so that none of the tungsten would be exposed to the alkaline metal vapor in the arc tube. U.S. Pat. No. 3,598,435 to Paul J. Jorgensen discloses a process wherein zirconium dioxide is formed on the niobium by coating the refractory metal with zirconium hydride or alternatively employing zirconium oxide or a zirconium rich niobium alloy by diffusion of zirconium into the niobium surface. The use of zirconium however, is believed to cause undesirable embrittlement of the niobium end cap.

SUMMARY OF THE INVENTION

The foregoing problems with respect to sealing refractory metals to alumina ceramics have been obviated in accordance with the present invention by providing a thin coating or layer of silicon metal between the refractory metal and the calcia-alumina sealing frit.

The refractory metal, preferably niobium, is coated with a slurry which principally comprises silicon metal and a vehicle. This coating is applied in an an amount of about three to five milligrams per square centimeter of surface and may be deposited by either painting or spraying. The coated refractory metal is then baked for a predetermined time at a predetermined temperature. A conventional glass sealing frit which principally comprises aluminum oxide and calcium oxide is then applied to the interface of the alumina ceramic and refractory metal and sealed by means of a conventional heating schedule.

It has been found that the silicon metal forms a strong chemically reactive bond with both the niobium metal and the oxide frit when a thin layer of silicon is used as an intermediate layer to form in essence a niobium-silicon-frit graded seal. There is apparently considerable reaction of the silicon with the niobium substrate with at least two regions of intermediate niobium-silicon compounds and a region of solid solubility of silicon in niobium. On the frit side there is evidence of silicon diffusion into the frit. This invention has particular applicability to the manufacture of high pressure sodium discharge lamps.

This invention produces a sealed high pressure sodium lamp arc tube which includes an elongated alumina arc tube body and a pair of refractory metal end caps associated with the ends of the arc tube body, and means sealing the end caps to the arc tube body which includes a coating of silicon on the interior surface of the refractory metal end cap and a glassy sealing frit principally comprising alumina and calcia interposed between the silicon coating and the alumina ceramic arc tube body.

BRIEF DESCRIPTION OF THE DRAWINGS

Many of the attendant advantages of the present invention will become more readily apparent and better understood as the following detailed description is considered in connection with the accompanying drawings, in which.

DESCRIPTION OF THE PREFERRED EMBODIMENTS

Figure 1:
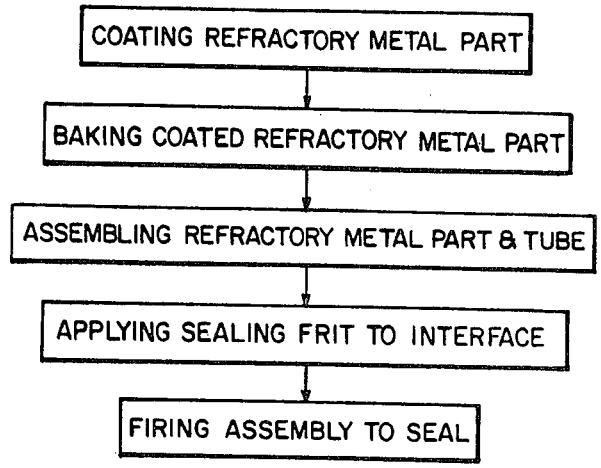
FIG. 1 is a block diagram illustrating the process of the present invention.

Referring now in detail to the drawings wherein like reference characters represent like parts throughout the several views, there is illustrated in FIG. 1 a block diagram depicting the steps required by this process to seal a refractory metal part to an alumina ceramic arc tube. In accordance with the novel process of this invention, a quantity of silicon metal powder of a size of approximately 400 mesh is mixed with a liquid vehicle, preferably alcohol, to a consistency which is somewhere between a thin paste and a viscous liquid. The viscosity of this slurry may be varied as will be readily apparent to anyone of ordinary skill in the art, depending on whether it is intended to apply the slurry to the refractory metal end cap by painting it on with a brush or spraying it onto the refractory metal surface. Either method has been found to be suitable. The slurry is applied to the refractory metal part, in the preferred embodiment, to the interior surface of a niobium end cap, in an amount of between about 3 to 5 milligrams per square centimeter of coated surface area. The coated refractory metal part is then baked at approximately 1400° C. for about 20 minutes in a vacuum to react the silicon with the refractory metal and bake off the liquid vehicle. The silicon could alternatively be applied by a vaporous deposition process in which case this baking step, to react the silicon with the refractory metal and remove the vehicle could be dispensed with.

After the refractory metal part has been prepared, either or both of the refractory metal part and the alumina ceramic part or arc tube, at their interface, are coated with a conventional calcia-alumina sealing frit and the parts are assembled for firing in accordance with the conventional sealing schedule of the type disclosed in U.S. Pat. No. 3,469,729 to R. B. Grekila et al. Such a sealing schedule for example, involves the heating of the assembled arc tube from room temperature to about 700° C. in about 3 minutes, the from 700° C. to between 1425° C. and 1550° C. at a rate of approximately 40° C. per minute for about 20 minutes. The assembly is then held at a temperature of from 1425° to 1550° C. for a period of approximately one minute and thereafter the assembly is cooled at a rate of about 30° C. per minute down to 700° C. at which time the furnace is turned off and the assembly permitted to cool to room temperature. An alternative sealing schedule involves bringing the arc tube from room temperature to 1365°–1400° C. in about 20 to 25 minutes, holding the arc tube at 1365°–1400° C. for about 5 minutes and thereafter reducing the temperature to about 1000° C. in about 12 minutes and holding at the 1000° C. temperature for about 10 minutes. The furnace temperature is then lowered to about 200° C. in 25 minutes at which point the furnace power is shut off and the arc tube permitted to cool to room temperature.

In the situations where a refractory metal end cap is being secured to a tubular polycrystalline alumina or sapphire arc tube body, assembly of the precoated refractory metal end cap to the arc tube body may occur prior to the application of the sealing frit. In this situation, the sealing frit is then applied to an area of the arc tube body adjacent the end of the refractory metal end cap skirt and during the sealing the heating cycle the frit will flow to the area between the end cap and the arc tube body by capillary action as is well known in the art of ceramic arc tube manufacture. Whether the alumina-calcia sealing frit is applied to the parts before or after assembly is not critical to the process of the invention.

Several alternative arc tube constructions are employed in the manufacture of high pressure sodium discharge lamps. In all instances a seal must be provided between the polycrystalline alumina or sapphire arc tube and a refractory metal part. One prevalent construction employs refractory metal end caps of the type illustrated in FIG. 2 in connection with the arc tube illustrated in FIG. 3. The end cap 10 generally includes a flat end portion 12 and an annular skirt portion 14 and may include a piece of refractory metal tubulation 16 extending through the center of the flat portion 12. At least one end of a high pressure sodium discharge lamp arc tube must include tubulation in order to provide for the final filling of the arc tube with the discharge sustaining sodium-mercury amalgam and a suitable starting gas. Although some manufacturers include a tubulation of both ends of the arc tube to provide for uniformity of parts, only one is necessary and in the embodiment illustrated in FIG. 3, the end cap 10 at the upper end of the arc tube does not include tubulation 16.

Figure 3:
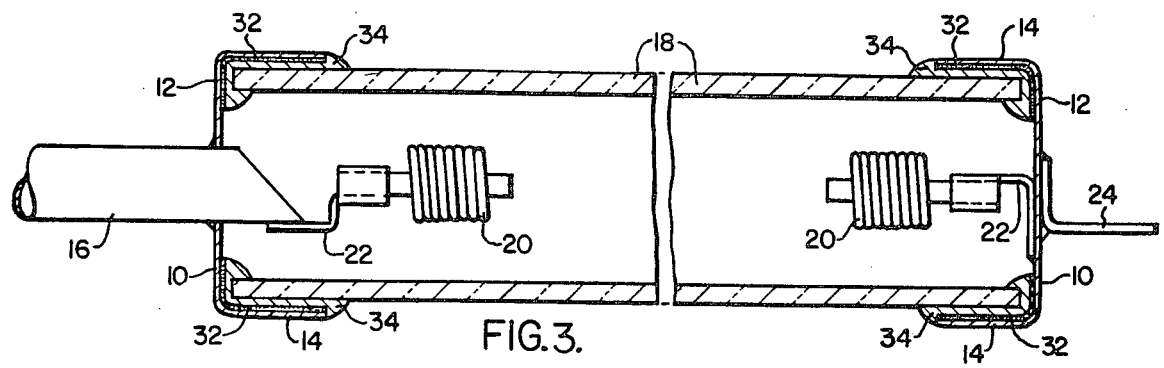
FIG. 3 is a side elevational view partly in section of a typical arc tube for a high pressure sodium discharge lamp.

Referring now to FIG. 3, a typical arc tube for a ceramic discharge lamp includes a tubular polycrystalline alumina or sapphire arc tube body 18 closed off at each end by a refractory metal end cap 10 preferably of niobium. Carried on the end cap assembly are oppositely disposed arc supporting electrodes 20 which are mounted, as illustrated in FIG. 3, to the tubulation of the tubulation carrying end cap by a strap 22 and directly to the non-tubulation carrying end cap by a similar strap 22. A refractory metal leadin conductor 24 carries current to the upper electrode as illustrated in FIG. 3 while the tantalum tubulation 16, which is brazed to the center of the end cap at 26 carries electrical current to the lower electrode 20.

In accordance with the present invention, the interface or surface 30 of the skirt portion 14 of the end cap 10 is coated with the silicon metal powder slurry as well as a portion of the flat end portion 12 of the end cap adjacent to the skirt portion 14. This coating 32 is then baked in a vacuum for about 20 minutes at 1400° C. The end caps are then placed on the ends of an arc tube body 18 and a sealing frit which principally comprises calcia and alumina in about eutectic proportions, but which may also include small quantities of silica, magnesia, or baria is applied to the intersection of the ends of the end cap skirt portions 14 and the arc tube body about the whole circumference of the arc tube body and the assembly placed in a furnace. This assembly is then heated in accordance with a conventional sealing schedule which causes the glassy sealing frit 34 to flow by capillary action to all those areas of interface between the end cap 10 and the arc tube body 18.

Figure 4:
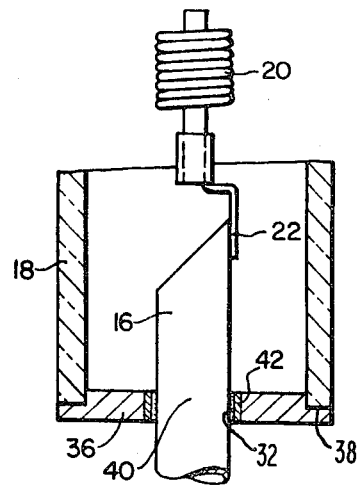
FIG. 4 is a side elevational view partly in section of an alternative construction for one end of a high pressure sodium discharge lamp arc tube.

The process of this invention is also applicable to high pressure sodium discharge lamp arc tubes constructed in accordance with the embodiment illustrated in FIG. 4. In that embodiment, the arc tube body 18 is closed off by a polycrystalline alumina disc 36 which is sealed to the arc tube body at 38 by any of the conventional sealing frits disclosed in the aforementioned U.S. patents. In this embodiment, a refractory metal, preferably tantalum or niobium tubulation extends through an aperture in the center of the polycrystalline alumina disc 36 and carries on its inner end an electrode support strap 22 and electrode 20. In this embodiment, the slurry of approximately 400 mesh silicon metal powder suspended in a liquid vehicle, for example alcohol, is coated on the tubulation in the area 40 which is intended to interface with the aperture in the ceramic end cap 36 in the same manner as it was applied to the interior surface of the end cap 10. The coated tubulation is then baked in a vacuum at 1400° C. for about 20 minutes before assembly with the ceramic end disc 36 again by means of a conventional calcia-alumina sealing frit at 42.

It should be also noted that varying amounts of the calcia-alumina sealing frit material may be mixed with the silicon metal slurry before the silicon metal slurry is applied to the refractory metal part. Lamps have been successfully sealed with silicon and frit combinations ranging from 90% silicon and 10% frit to 10% silicon and 90% frit. When such mixtures are employed it has been found to be preferable that the ratio of silicon to frit mixture should be on the order of about 80% silicon and 20% glassy sealing frit.

Figure 2:
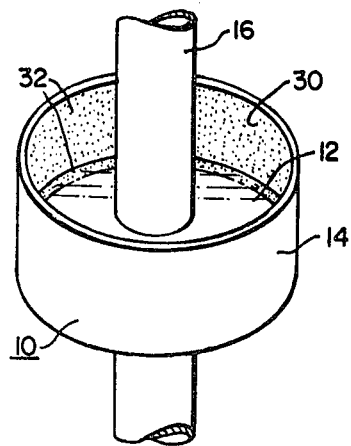
FIG. 2 is a perspective view of a typical end cap for a high pressure sodium discharge lamp.

Seals prepared by applying silicon metal powder in slurry form directly to the refractory metal end cap of the embodiment of FIGS. 2 and 3 have been employed in several 400 watt high pressure sodium test lamps. In one such test a silicon-coated test lamp was burned at 100% overwattage (400 watt lamp burned at 800 watts) and frequently on-off cycled. Such treatment was expected to give much greater thermal shock to the seal and greatly exaggerate any thermal mismatch problems. This test lamp survived for over 2000 hours and over 500 cycles without any sign of seal failure. Under such severe test conditions, standard lamps were found to survive only an average of 200 hours and 50 cycles.

As will be apparent from the foregoing, the sealing process of this invention has provided significantly improved seals between the niobium end caps and the polycrystalline alumina body of the arc tube in high pressure sodium discharge lamps as well as significantly longer lamp life.

What is claimed is:

1. The method of bonding a refractory metal to a high alumina content material comprising the steps of:
   coating the refractory metal with a slurry which principally comprises silicon metal and a liquid vehicle;
   baking the refractory metal having a slurry thereon in a vacuum for a predetermined time at a predetermined temperature;
   coating one of said high alumina content material and said coated refractory metal with a sealing frit principally comprising calcia and alumina;
   assemblying said high alumina content material and said refractory metal with said sealing frit therebetween; and
   baking said assembly in accordance with a predetermined sealing schedule whereby an improved bond is provided between said refractory metal and said high alumina content material.

2. The method of claim 1 wherein said liquid vehicle is alcohol.

3. The method of claim 1 wherein said refractory metal is coated with said slurry in an amount of from between about 3 and 5 milligrams per square centimeter.

4. The method of claim 1 wherein said baking of the refractory metal having the slurry thereon is at 1400° C. for about 20 minutes.

5. The method of bonding refractory metal end caps to the alumina arc tube of a high pressure sodium discharge lamp comprising the steps of:
   coating the interior surface of the refractory metal end caps with a slurry principally comprising silicon metal and a liquid vehicle;
   baking the refractory metal end caps having the slurry thereon in a vacuum for a predetermined time at a predetermined temperature;
   coating at least one of said alumina arc tube and said coated refractory metal end caps with a sealing frit principally comprising calcia and alumina;
   assembling said refractory metal end caps and said alumina arc tube body with said sealing frit therebetween; and
   baking said assembly in accordance with a predetermined sealing schedule whereby an improved bond is provided between said refractory metal end caps and said alumina arc tube body.

6. The method of claim 5 wherein said liquid vehicle is alcohol.

7. The method of claim 5 wherein said refractory metal end caps are coated with said slurry in an amount of from between about 3 and 5 milligrams per square centimeter.

8. The method of claim 5 wherein said baking of said refractory metal end caps having the slurry thereon is at 1400° C. for about 20 minutes.

9. The method of claim 5 wherein said refractory metal end caps are niobium.

* * * * *